US005122947A

United States Patent [19]

Hishiki

[11] Patent Number: 5,122,947

[45] Date of Patent: Jun. 16, 1992

[54] FLYBACK TRANSFORMER HAVING COIL ARRANGEMENT CAPABLE OF REDUCING LEAKAGE OF MAGNETIC FLUX

[75] Inventor: Hideo Hishiki, Iwai, Japan

[73] Assignee: Victor Company of Japan, Ltd., Yokohama, Japan

[21] Appl. No.: 501,943

[22] Filed: Mar. 30, 1990

[30] Foreign Application Priority Data

Mar. 31, 1989 [JP] Japan ........................ 1-83752

[51] Int. Cl.[5] ........................ H02M 7/10

[52] U.S. Cl. ........................ 363/61; 323/362; 336/178; 363/68; 363/126

[58] Field of Search ........................ 323/362; 363/68, 61, 363/126; 336/178, 183, 184; 315/411

[56] References Cited

U.S. PATENT DOCUMENTS

| | | | |
|---|---|---|---|
| 3,886,434 | 5/1975 | Schreiner | 336/184 |
| 4,066,955 | 1/1978 | Suthers | 363/68 |
| 4,980,811 | 12/1990 | Suzuji et al. | 323/362 |

FOREIGN PATENT DOCUMENTS

| | | | |
|---|---|---|---|
| 1813231 | 10/1969 | Fed. Rep. of Germany | 336/184 |
| 76637 | 6/1977 | Japan | 363/126 |
| 129313 | 10/1979 | Japan | 336/184 |

*Primary Examiner*—William H. Beha, Jr.

*Attorney, Agent, or Firm*—Fleit, Jacobson, Cohn, Price, Holman & Stern

[57] ABSTRACT

A flyback transformer comprising a magnetic core assembled by joining together a pair of first and second U-shaped core halves each having two leg portions with end surfaces respectively joined in mutually abutting confrontation with respective gap spacers interposed therebetween at first and second core joint parts and a coil wound around the core joint parts. The coil includes, as an input winding, a primary winding divided into first and second primary windings which are wound at least around the two core joint parts of the core and are connected in parallel. By this arrangement, the magnetic fluxes generated at the two core joint parts cancel each other, and reduce the leakage flux field. Optionally, the two divided windings of the primary winding are each divided further into two windings wound around the leg portions on opposite sides of the spacers. At the same time, the first primary winding on the leg portion on one side and the second primary winding on the other side are connected in series. Furthermore, the first primary winding on the leg portions on the other side and the second primary winding on one side are connected in series. The coil includes, as an output winding, a secondary winding which can be operationally divided into at least two windings wound so as to envelop each of the two joint parts to thereby reduce the leakage flux.

13 Claims, 7 Drawing Sheets

FLYBACK TRANSFORMER HAVING COIL ARRANGEMENT CAPABLE OF REDUCING LEAKAGE OF MAGNETIC FLUX

BACKGROUND OF THE INVENTION

The present invention relates to flyback transformers for supplying an anode voltage to a cathode-ray tube (hereinafter referred to as a "CRT") display device such as a TV image receivers or the like, and more particularly to a flyback transformer which is capable of reducing leakage of magnetic flux.

The CRT display devices which are used as TV receivers or display terminal devices for computers or the like, have several parts or components, for example, flyback transformers for supplying an anode voltage to the CRT. These components generate a leakage magnetic field which leaks out to the circumferences of the CRT display. Such unnecessary electromagnetic radiation has an adverse effect upon the operation of electronic devices and equipment in the vicinity of the CRT. Furthermore, in recent research and experiments on the effect of the magnetic fields to humans and animals, this leakage magnetic field is determined to have a detrimental effect upon all living creatures.

Accordingly, various proposals for overcoming this problem have been made in the prior art. To assist a full understanding of the present invention, the nature and limitations of the flyback transformers of the prior art will first be described with respect to typical examples thereof and with reference to FIGS. 1 to 2D of the accompanying drawings, which will be briefly described hereinafter.

As shown in FIG. 1, a conventional flyback transformer 1 has a pair of U-shaped magnetic cores 2 and 3 respectively having leg portions 2*a*, 2*b*, 3*a* and 3*b* which are in a mutually opposing state. The mutually confronting leg portions 2*a* and 3*a* on one side are inserted into a common conductor winding (hereinafter referred to as a coil) 5. The end surfaces of the leg portions 2*a* and 3*a* on one side and the portions 2*b* and 3*b* on the other side respectively face each other to thus form a rectangular magnetic path. In order to prevent the saturation of the cores 2 and 3, gap spacers 4*a* and 4*b* are inserted between the above mentioned facing end surfaces, thereby forming gaps 6*a* and 6*b* therebetween.

In the case where the gaps 6*a* and 6*b* are formed in the manner between the end surfaces of the core leg portions, magnetic flux leaks from the gap 6*b* formed outside of the coil 5. This leakage flux not only has an adverse effect on various electronic components installed around the flyback transformer but also leaks out of the apparatus to become a cause of various deleterious effects.

Accordingly, as a measure for reducing these undesirable effects, a flyback transformer 1X as illustrated in FIG. 2A has been proposed in Japanese Utility Model Application Laid-open Publication No. 61-79511 (1986). The flyback transformer 1X has a pair of U-shaped cores 2X and 3X wherein the leg portions 2*a* and 3*a* on the side of a coil 5 are made slightly shorter than the leg portions 2*b* and 3*b* on the other side, to thereby form a rectangular magnetic path. In the gap between the mutually confronting leg portions 2*a* and 3*a* on the side of the coil 5, a gap spacer 4X is inserted in a collective manner. The mutually confronting leg portions 2*b* and 3*b* outside of the coil 5 are placed into intimate abutting contact. By the construction of the flyback transformer 1X, the leakage of flux from the abutting portions of the leg portions 2*b* and 3*b* is greatly reduced.

In the flyback transformer 1X as shown in FIG. 2A, it is necessary to use a gap spacer 4X having a thickness which is approximately twice that of each of the gap spacer 4*a* and 4*b* inserted into the gaps 6*a* and 6*b* of the flyback transformer 1 shown in FIG. 1. For this reason, as shown in FIG. 2B, the expansive bulging of the outer side of the main magnetic flux 7 from the gap 6X within the coil 5 increases. This causes a temperature rise of conductors (windings) in the vicinity of the gap 6X. This phenomenon, which has been described in detail in Japanese Utility Model Application Laid-open Publication No. 61-5786 (1986), will now be considered in conjunction with FIGS. 2A and 2B.

In FIG. 2B, reference numerals 5*a* to 5*f* designate cross sections of the electroconductor wire forming the coil 5. Each pair of the cross sections 5*a* and 5*b*, 5*c* and 5*d*, and 5*e* and 5*f* represent the upper and lower ends, respectively, of the same winding loop. The direction of the electric current flow is indicated by the conventional symbols ⊗ and ●. The symbol ⊗ indicates that the current is flowing away from the viewer. The symbol ● indicates the opposite current direction, i.e., towards the viewer. As the result of the current flow successively through these wire loops, magnetic flux is generated around the wire of each loop as indicated by the intermittent arc arrows. These small fluxes are aggregated as a group, whereby a magnetic flux 8 circulates around the cores 2X and 3X. At the portion of the gap 6X, the main flux 7 assumes an expansive bulged state on the outer side at its two ends.

A small magnetic flux is generated around the wires 5*c* and 5*d* of the coil 5 interposed between the two ends of the main magnetic flux 7 as described above. The direction of the small flux is reverse to that of the main magnetic flux 7. For this reason, the wire part 5*a* and 5*d* is completely meaningless when viewed from the coil 5 as a whole. As a matter of fact, this wire part reduces the main magnetic flux 7. As a consequence, reduction of inductance and increase in coil copper loss occur. Thus the temperature of the wire in the vicinity of the gap 6X is caused to rise. When the temperature of one part of the coil 5 rises locally in this manner, there is the undesirable possibility of reduction of the serviceable lives of the flyback transformer itself and of the electronic components installed therearound.

In the operation of the flyback transformer of the above described construction, it is true that the leakage of flux from the part of the gap 6X can be reduced, it being possible to decrease the leakage of flux from ¼ to 1/5 of that of the prior art example shown in FIG. IA. However, as indicated in FIGS. 2C and 2D, the leakage flux 9 from the cores 2 and 3 and the coil 5 is large. Consequently, this construction is inadequate as a solution to the requirement for reducing the leakage magnetic field with reference to flyback. For this reason, it has been the practice in the prior art to insert the flyback transformer 1X into a shield case or to encase the entire chassis (not shown) of the CRT display within a metal shield.

However, the shortening of the serviceable life of the flyback transformer due to local overheating of the coil and the various measures described above entail extremely high cost. Moreover, the productivity of the CRT display deteriorates. At the same time, the temperature of the chassis part rises and gives rise to problems such as frequency performance failures.

SUMMARY OF THE INVENTION

An object of the present invention is to provide a flyback transformer with reduced leakage flux.

In order to achieve the above object, a flyback transformer according to the present invention comprises a magnetic core rectangular closed-figure shape formed by joining the leg portions of a set of U-shaped or UI shaped magnetic cores so as to abut gap spacers interposed therebetween, and a primary winding divided into first and second parts respectively wound on the core leg portions of one side and the other side and connected in parallel to each other.

Furthermore, the flyback transformer of this invention may have a secondary winding divided into several parts which are wound around one and/or both part(s) of the primary winding.

By the aforementioned configuration, the leakage flux field from the flyback transformer can be greatly reduced.

In the flyback transformer of the present invention as described above, at least the primary winding is divided into the first and second parts which are wound around the core leg portions on both sides. The currents flowing through these parts of the primary winding are made substantially the same, and this balance of currents of both parts is maintained with load fluctuations. Accordingly, by making it possible to attain a balance of the leakage fluxes generated from the two leg portions, the leakage flux at the part where the leakage fluxes of the two leg portions cancel each other is reduced to a minimum. At the same time, by dividing the primary winding into two leg portions respectively, the current flows in two parts. By this measure, the leakage flux generated from the windings is reduced by half, and the leakage fluxes of the entire flyback transformer can be reduced to an extent of the order of $\frac{1}{3}$ to 1/6 of that in a conventional transformer. The metal case for shielding the flyback transformer is therefore unnecessary. This is advantageous to operating temperature reduction. As the result, miniaturization of the flyback transformer becomes possible.

In addition, the flyback transformer of the present invention has following advantages and useful features. A leakage flux is generated perpendicularly to a winding. For this reason, by installing the flyback transformer so as to cancel the magnetic field generated in the tube screen of a CRT such as that of a TV receiver or a display monitor device, leakage flux or leakage or leakage electromagnetic waves from devices such as receivers and monitor devices can be reduced. Moreover, since a core with leg portions of the same height is used, the cost of the core is lowered.

Furthermore, gap spacers can be inserted between two leg portions of the core. Therefore, in comparison with the conventional core, a spacer thickness which is approximately one half of that used in the prior art, is sufficient. Local overheating at the winding parts due to a leakage flux field is reduced, so that reliability is improved and costs are reduced.

DETAILED DESCRIPTION OF THE PREFERRED EMBODIMENTS

There will now be described in detail preferred embodiments of a flyback transformer according to the present invention with reference to FIGS. 3 to 13.

Figure 3A:
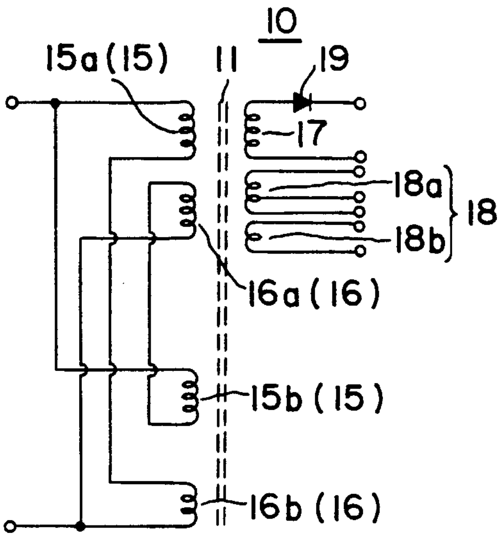
FIG. 3A is a circuit diagram of a flyback transformer according to a first embodiment of the present invention.
Figure 3B:
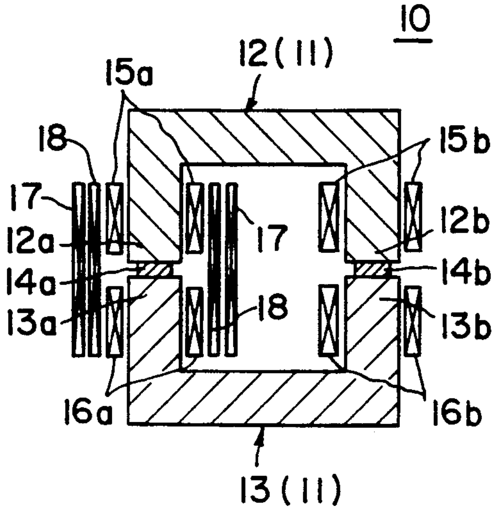
FIG. 3B is a sectional view showing the arrangement of the core and windings of the transformer of the first embodiment shown in FIG. 3A.

A flyback transformer 10 according to a first embodiment of the present invention, as shown in FIGS. 3A and 3B, comprises a core 11 having halves 12 and 13, a gap spacer 14 having spacers 14*a* and 14*b* interposed between leg portions 12*a* and 13*a* and between 12*b* and 13*b*, respectively. Two primary windings 15 and 16, respectively comprising windings 15*a* and 15*b* and windings 16*a* and 16*b*, are provided and connected as shown in FIG. 3A. With respect to the primary windings 15*a* and 16*a*, a secondary winding 17 and a tertiary winding 18 are intimately wound.

More specifically, as shown in FIG. 3B, the core 11 of the flyback transformer 10 comprises the two U-shaped core halves 12 and 13 assembled to form an integral rectangular structure. Around the mutually confronting leg portions 12*a*, 13*a*, 12*b* and 13*b* of the core 11, the first primary windings 15*a* and 16*a* and the second primary 15*b* and 16*b* are respectively wound. Although the tertiary winding 18 is shown in FIG. 3A as comprising a plurality of windings 18*a* and 18*b* and in FIG. 3B as a single winding, the number of windings may be selected at will. Furthermore, the primary winding set of 15*a* and 16*a* and that of 15*b* and 16*b* in FIG. 3B may be interchanged. Also, the disposition of the primary windings 15*a* and 16*a* or that of the primary windings 15*b* and 16*b* may be changed or superposed. Such modifications will result in substantially the same operational effect. Reference numeral 19 in FIG. 3A designates a high-voltage rectifier diode.

As shown in FIG. 3B, the primary windings 15*a*, 15*b*, 16*a* and 16*b* are respectively wound around separate leg portions 12*a*, 13*a*, 12*b* and 13*b* of the core halves 12 and 13. By the arrangement, the electric current flowing through the primary windings 15 and 16 wound around the leg portions 12*a*, 13*a*, 12*b* and 13*b* can be made to be equal. More particularly, in the case where the load of the secondary winding 17 or the tertiary winding 18 varies, also, the currents flowing through the primary windings 15*b* and 16*b*, which are in a loose-coupling relation to the secondary winding 17 and tertiary winding 18 also vary in accordance with this load variation. Leakage fluxes 21*a*, 21*b*, 22*a* and 22*b* generated from the primary windings wound around the separate leg portions 12*a*, 13*a*, 13*a* and 13*b* and from the leg portions also increase and decrease in the same proportion as the two leg portions of the core and also with respect to the load variation, as indicated respectively in FIGS. 4A, 4B and 5. Reference numeral 21 designates collectively windings 15 through 18 in aggregate.

Therefore, the leakage fluxes 22*a*, 22*b*, 23*a* and 23*b* generated from the leg portions 12*a*, 13*a*, 12*b* and 13*b* of the core are substantially balanced at all times. The leakage flux 22*a* generated from the side of the leg portions 12*a* and 13*a* and the leakage flux 22*b* generated from the side of leg portions 12*b* and 13*b* are generated in the directions indicated in FIGS. 4A and 4B. These fluxes 22*a* and 22*b* are almost canceled in the cross-hatched portion shown in FIG. 6. Furthermore, the primary current is divided into two parts respectively supplied to the two leg portions. As a result, the leakage flux generated from each primary winding is also of the order of approximately one half of that in the prior art example.

Figure 1:
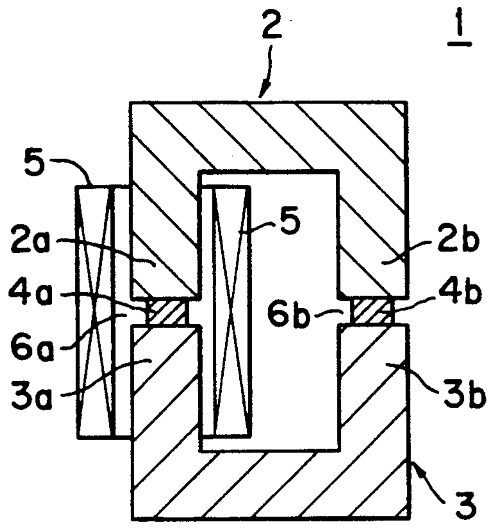
FIG. 1 PRIOR ART
FIG. 1 is a schematic sectional view showing the arrangement of the core and a winding of one example of a flyback transformer of the prior art.
Figure 2A:
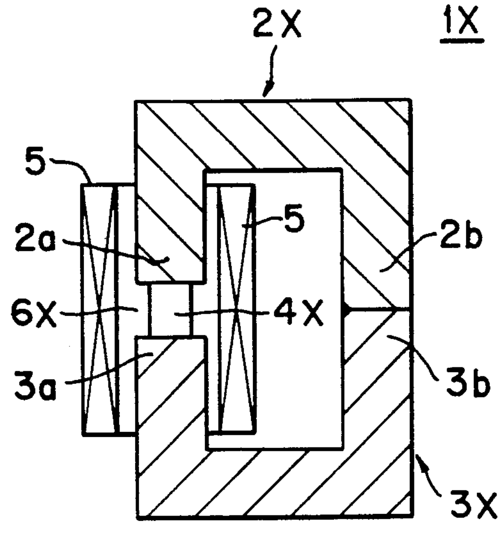
FIG. 2A PRIOR ART
FIG. 2A is a similar view of another example of a known flyback transformer.
Figure 2B:
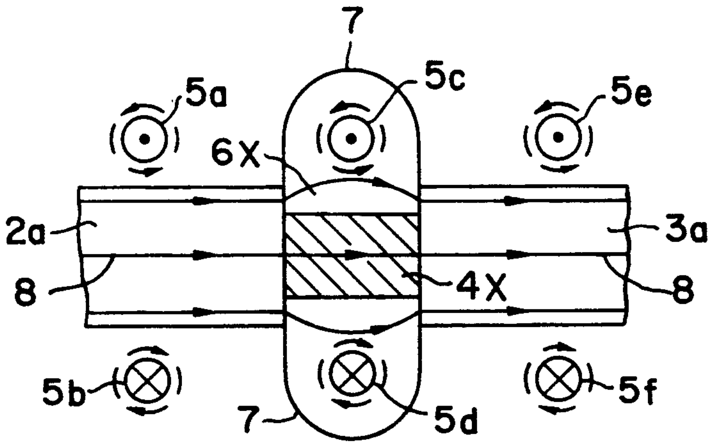
FIG. 2B PRIOR ART
FIGS. 2B to 2D are diagrams for describing the principles involved in the leakage flux field of the flyback transformer shown in FIG. 2A.
Figure 2C:
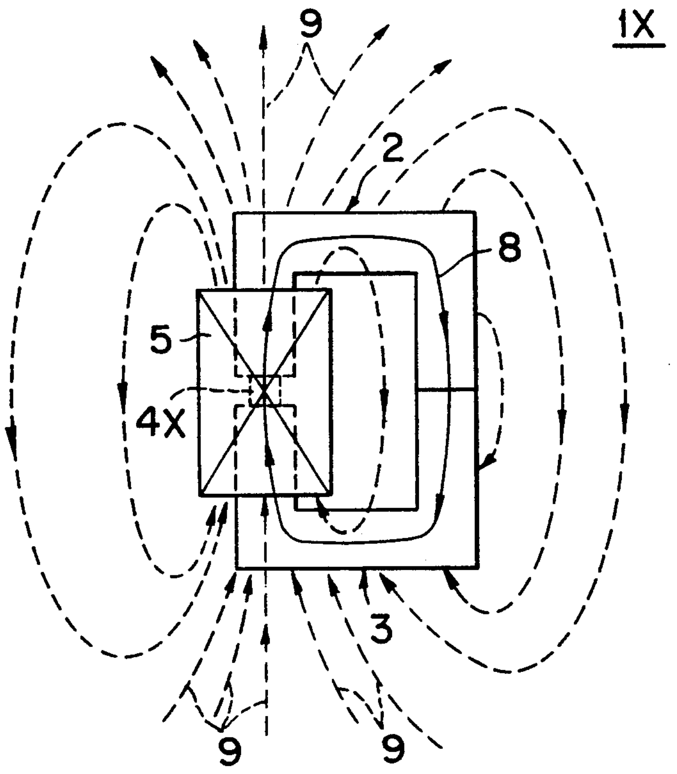
FIG. 2C PRIOR ART
Figure 2D:
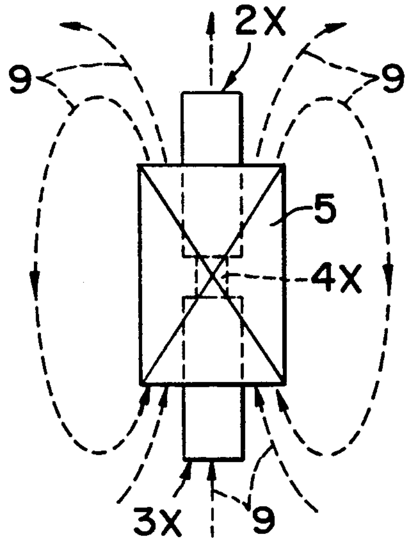
FIG. 2D PRIOR ART
Figure 4A:
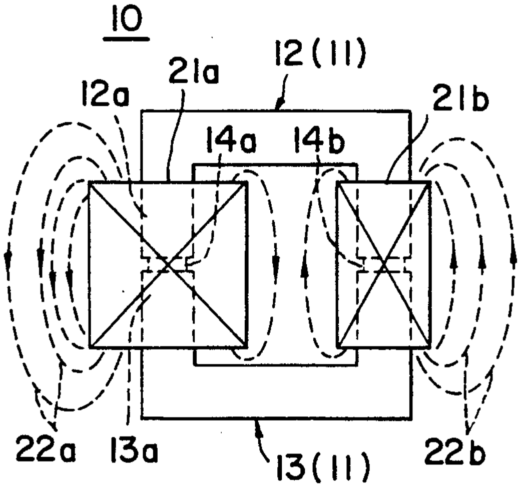
FIGS. 4A, 4B, 5, 6 and 7 are diagrams for explaining the principle involved in the leakage flux of the flyback transformer according to the first embodiment of this invention.
Figure 4B:
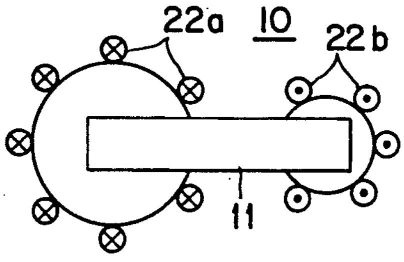
Figure 5:
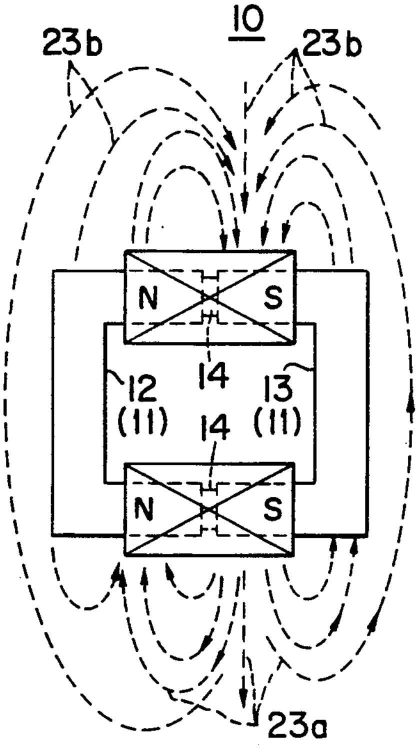
Figure 6:
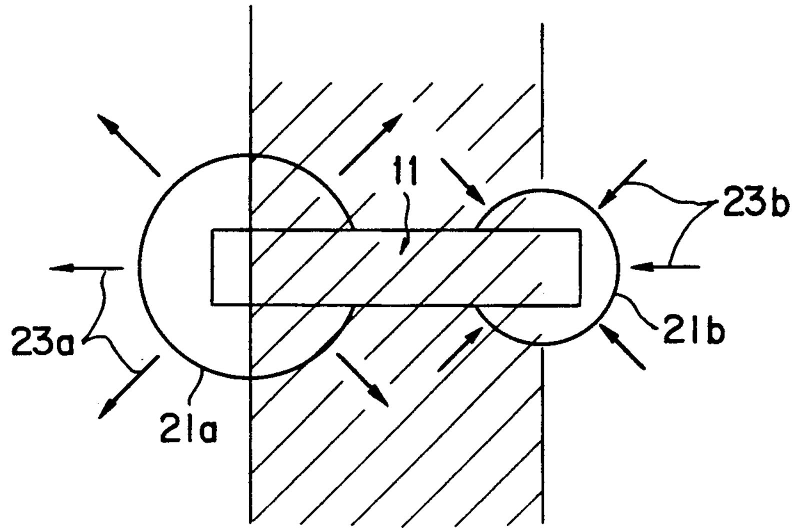
Figure 7:
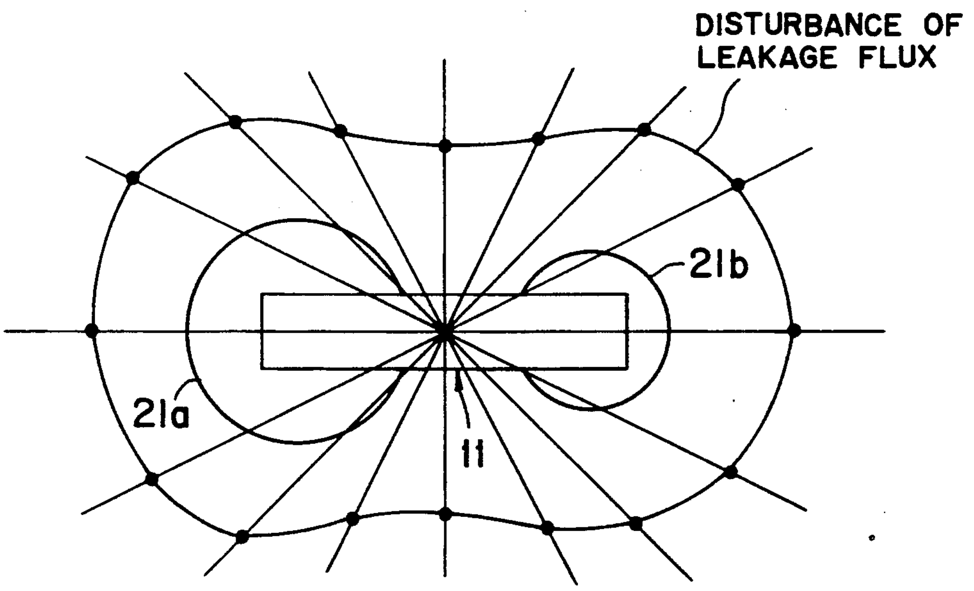

FIGS. 4A and 4B show one example of generation of leakage fluxes 22*a* and 22*b* from the windings 21*a* and 21*b* in the directions indicated. In this case, leakage magnetic fluxes 23*a* and 23*b* are generated through the gap spacer 14 on the sides of the core leg portions 12*a*, 13*a*, 12*b* and 13*b* as though magnetic poles as shown in FIG. 5 were established. Leakage magnetic fields are generated at approximately the centers of the windings 21*a* and 21*b* in the arrow directions shown in FIG. 6, but in the cross-hatched region of FIG. 6, these directions are those causing cancellation. In other regions also, the leakage magnetic fields are being generated in a state of being divided for the two leg portions. For this reason, the leakage flux is less than that in the known examples described hereinbefore and shown in FIGS. 1 and 2. The pattern of the leakage magnetic field in comprehensive three-dimensional directions also assumes a distribution as indicated in FIG. 7 and has the characteristic of being reduced to ½ to 1/6 of that in the prior art examples.

In this condition, as shown in FIG. 3A, the number of winding turns of the primary windings 15*a*, 16*a*, 15*b* and 16*b* are determined by appropriate adjustment in accordance with the load conditions so as to minimize the leakage flux. It will be obvious that, when the winding directions of the windings or directions of current flow are reversed, the directions of the leakage flux are also reversed.

Figure 8A:
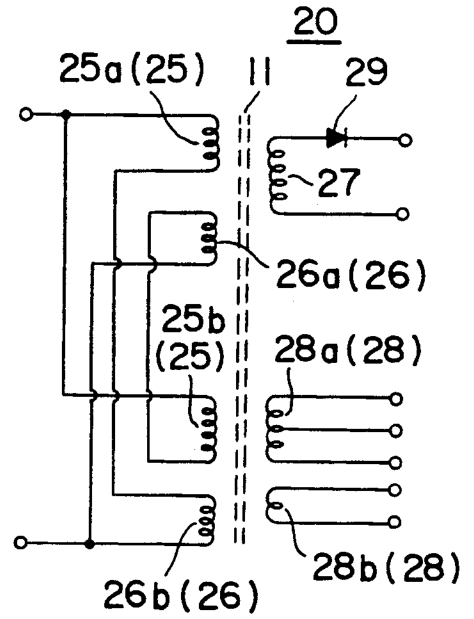
FIGS. 8A and 8B are a circuit diagram and a sectional view, respectively, both showing the arrangement of the core and windings of a flyback transformer according to a second embodiment of the present invention.
Figure 8B:
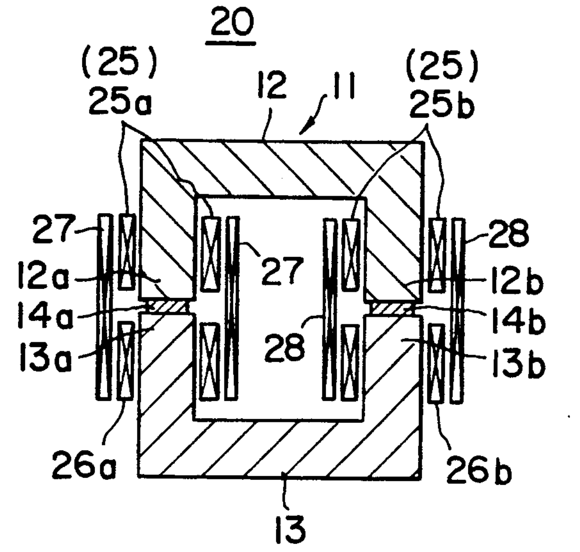

Next, a flyback transformer 20 according to the second embodiment of the present invention will be described in detail with reference to FIGS. 8A and 8B. The second embodiment differs from the preceding first example as shown in FIGS. 3A and 3B on the following point. The tertiary winding 28 is wound on the side of the leg portions 12*b* and 13*b* of the core 11. By this arrangement, an even more uniform balance of the load on the two leg portions is attained for the purpose of reducing the leakage flux. In the second embodiment, even though the leg portions on which the secondary winding 27 and the tertiary winding 28 are respectively wound, are interchanged, the same operational effect may be obtained.

Figure 9A:
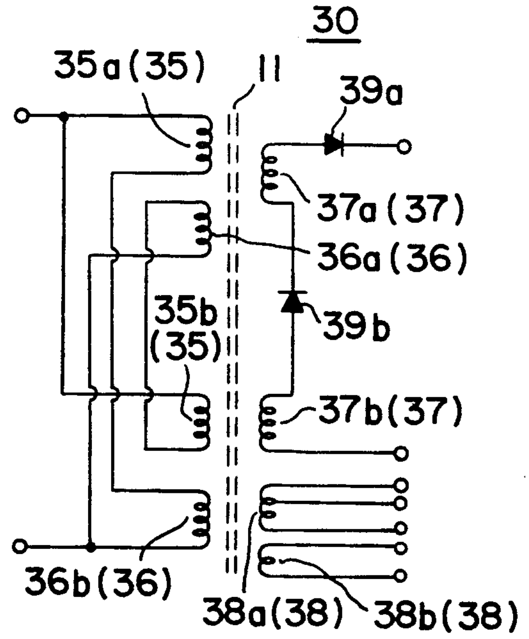
FIGS. 9A and 9B are a circuit diagram and a sectional view, respectively, both showing the arrangement of the core and windings of a flyback transformer according to a third embodiment of the present invention.
Figure 9B:
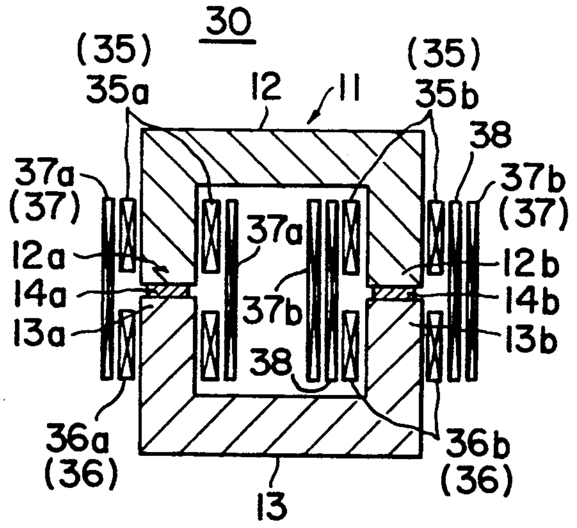

A flyback transformer according to a third embodiment of the present invention is shown in FIGS. 9A and 9B. The third embodiment differs from the preceding first and second embodiments in that the secondary winding (high-voltage output winding) 37, in which the load fluctuates greatly during operation, is divided into two windings 37*a* and 37*b*. These windings 37*a* and 37*b* are wound around leg portions 12*a* and 13*a*, and 12*b* and 13*b*, respectively, and are connected in series by way of a diode 39*b* connected therebetween. This arrangement affords a further improvement in the balance of the leakage fluxes from the two core leg portions at the time of load fluctuation. A tertiary winding 38 has the same construction as the tertiary winding 28 shown in FIGS. 8A and 8B. The tertiary winding 38 is interposed between second primary windings 35*b* and 36*b* and second secondary winding 37*b*.

Figure 10A:
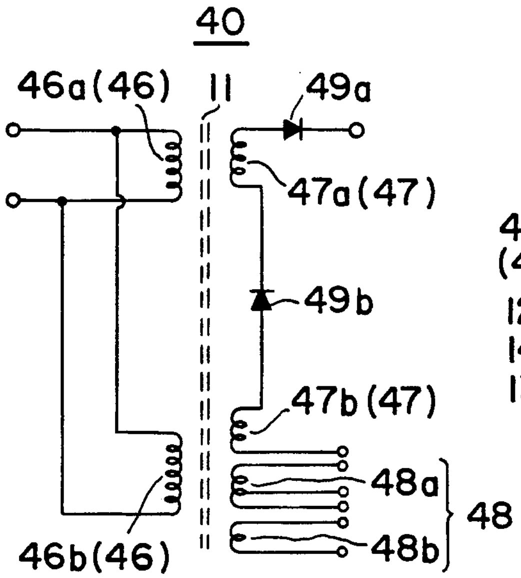
FIGS. 10A and 10B are a circuit diagram and a sectional view, respectively, both showing the arrangement of the core and windings of a flyback transformer according to a fourth embodiment of the present invention.
Figure 10B:
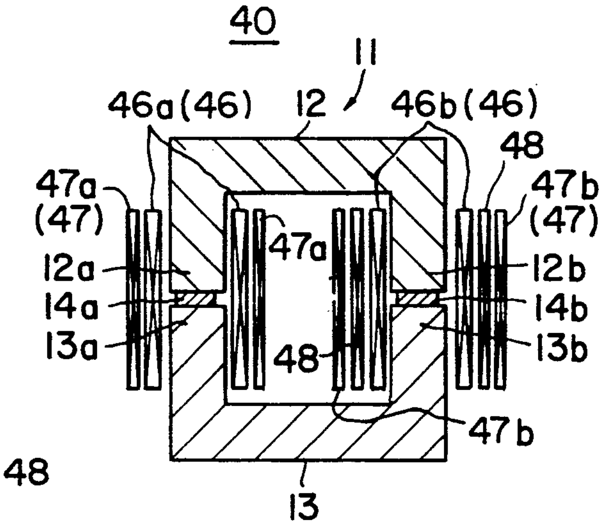

FIGS. 10A and 10B illustrate a flyback transformer 40 according to a fourth embodiment of the present invention. The fourth embodiment differs from the preceding embodiments in the following features. The primary windings 46*a* and 46*b* are dividedly wound around the leg portions 12*a* and 13*a*, and 12*b* and 13*b*, respectively, and are connected in parallel. At the same time, the secondary windings 47*a* and 47*b* are also dividedly wound around the leg portions 12*a* and 13*a*, and 12*b* and 13*b*, respectively. The tertiary winding 48 (48*a* and 48*b*) may be wound around either of the leg portions. By this arrangement, the load at each core leg portion is well balanced, so that the leakage flux is reduced.

Figure 11A:
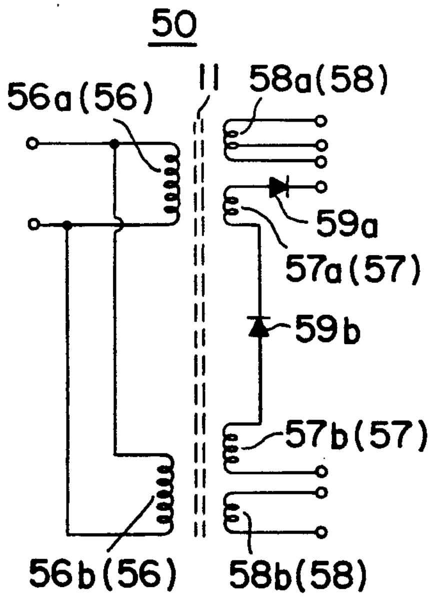
FIGS. 11A and 11B are a circuit diagram and a sectional view, respectively, both showing the arrangement of the core and windings of a flyback transformer according to a fifth embodiment of the present invention.
Figure 11B:
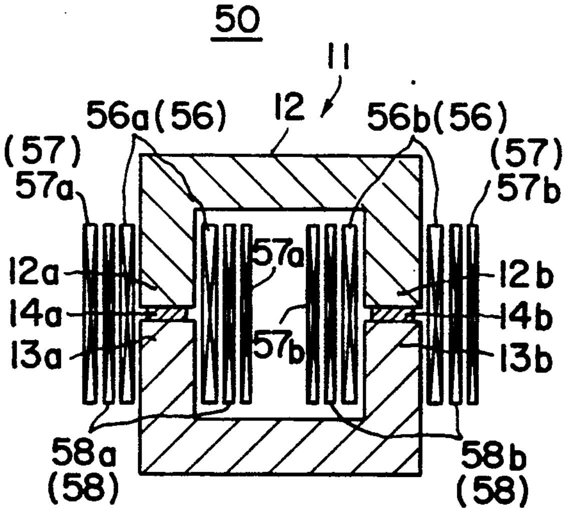

A flyback transformer 50 according to a fifth embodiment of the present invention is shown in FIGS. 11A and 11B. The feature of the fifth embodiment differs from those of the preceding embodiments as follows. Not only the primary windings 56*a* 56*b* but the secondary winding 57 and the tertiary winding 58 are also divided respectively into two parts 57*a* and 57*b* and 58*a* and 58*b*, which are respectively wound around the core leg portions 12*a* and 13*a* and 12*b* and 13*b*.

Figure 12:
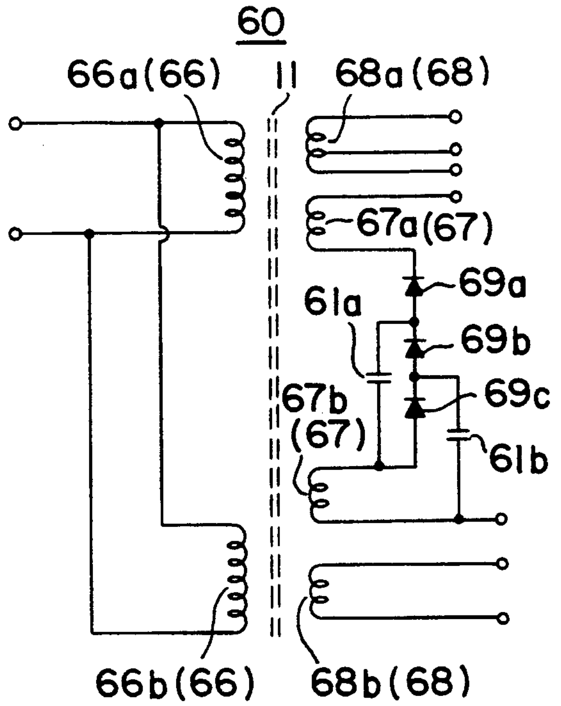
FIG. 12 is a circuit diagram of a flyback transformer according to a sixth embodiment of the present invention.
Figure 13:
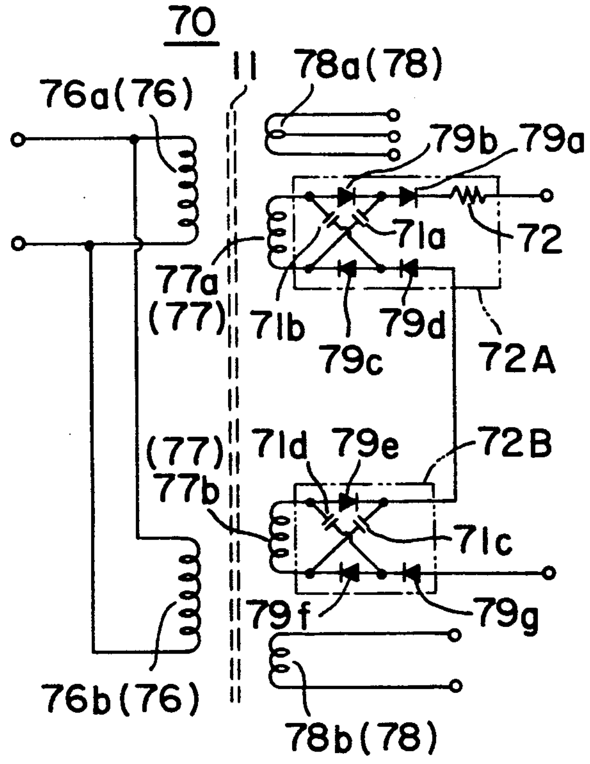
FIG. 13 is a circuit diagram of a flyback transformer according to a seventh embodiment of the present invention.

A flyback transformer according to a sixth embodiment of the present invention, is illustrated in the circuit diagram of FIG. 12. In this embodiment, a voltage doubler rectifier circuit comprising diodes 69*a*, 69*b* and 69*c* and capacitors 61*a* and 61*b*, is used as a rectifier circuit of the secondary winding 67 comprising windings 67*a* and 67*b*.

In the seventh embodiment according to the present invention, a flyback transformer 70 comprises a secondary windings 77 which is divided into windings 77*a* and 77*b*. A first voltage doubler rectifier circuit 72A is connected to the first winding 77*a*, and comprises diodes

79*a*, 79*b*, 79*c* and 79*d*, and capacitor 71*a* and 71*b*, and a resistor 72 connected between an output terminal on one side and the first secondary winding 77*a*. At the same time, a second voltage rectifier circuit 72B is connected to the second winding 77*b*, and comprises diodes 79*e*, 79*f* and 79*g* and capacitors 71*c* and 71*d*.

Thus, there are a number of methods of rectification of the secondary windings. However, there is no necessity for specifying the rectifier circuit in a transformer with windings of the arrangement according to the present invention. The reason for this is that the uniquely characteristic effectiveness of the flyback transformer of this invention can be obtained irrespective of the form of the rectifier circuit connected to the secondary windings.

What is claimed is:

1. A flyback transformer comprising a magnetic core which is assembled by joining a pair of first and second magnetic core halves each having two leg portions, said core halves joined at respective two end surfaces of said leg portions thereof in mutually abutting confrontation with respective gap spacers interposed therebetween thereby to form a closed-figure magnetic core having first and second core joint parts and primary coil means around said core joint parts and secondary coil means wound over said core joint parts and secondary coil means wound over said primary coil means, and said coil joint part, and a second winding wound around said second core joint part, and said first and second windings being connected in parallel to function as an input winding;

wherein said first primary winding is divided into two windings wound around respective leg portions of said first core half near, not around, said gap spacers, one winding of said first primary winding is wound near said first core joint part being connected electrically in series with one winding of said second primary winding wound near said second core joint part, and the other winding of said first primary winding is connected electrically in series with the other winding of said second primary winding;

said flyback transformer further including a secondary winding and tertiary winding wound around and completely enveloping the first and second primary windings which are wound around either one of said core joint parts, said secondary winding and said tertiary winding functioning as output windings to thereby reduce the leakage flux field to a minimum;

and wherein said secondary winding is wound densely as an outermost winding and said tertiary winding is densely between said first primary winding and said secondary winding.

2. The flyback transformer according to claim 1, further comprising:

a secondary winding wound densely around and completely enveloping the primary winding divided into two windings and wound around either one of said core joint parts, said secondary winding functioning as an output winding to thereby reduce the leakage flux field to a minimum; and a tertiary winding wound densely around and completely enveloping the primary winding divided into two windings and wound around the other of said core joint parts, said tertiary winding functioning as an output winding to thereby reduce the leakage flux field to a minimum.

3. The flyback transformer according to claim 1 or 2 wherein said tertiary winding is divided into a plurality of windings.

4. The flyback transformer according to claim 1, further comprising a first secondary winding wound densely around and completely enveloping said first primary winding, said first secondary winding functioning as output to thereby reduce the leakage flux field to a minimum;

a second secondary winding wound densely around two completely enveloping said second primary winding, said second secondary winding functioning as an output winding to thereby reduce the leakage flux field to a minimum; and a plurality of a tertiary windings interposed between said second primary winding and said second secondary winding.

5. A flyback transformer comprising a magnetic core which is assembled by joining a pair of first and second magnetic core halves each having two leg portions, said core halves joined at respective two end surfaces of said leg portion thereof in mutually abutting confrontation with respective gap spacers interposed therebetween thereby to form a closed-figure magnetic core having first and second core joint parts and primary coil means wound around said core joint parts and secondary coil means wound over said primary coil means, and said coil means including a first primary winding wound around said first core joint part, and second primary winding wound around said second core joint part, and said first and second windings being connected in parallel to function as an input winding;

wherein said first primary winding is wound around and completely envelopes one of said first and second core joint parts, and said second primary winding is wound around and completely envelopes the other core joint part;

and wherein said transformer further includes a first secondary winding functioning as an output winding and wound tightly around said first primary winding in correspondence thereto to reduce the leakage flux field to a minimum, a second secondary winding functioning as an output winding and wound tightly around said second primary winding in correspondence thereto to thereby reduce the leakage flux field to a minimum, and a first tertiary winding functioning as an output winding and wound tightly between said second primary winding and said second secondary winding.

6. The flyback transformer according to claim 5, further comprising a second tertiary winding functioning as an output winding and wound tightly between said first primary winding and said first secondary winding.

7. The flyback transformer according to claim 6 wherein either of the first and second tertiary windings is divided into a plurality of windings, which are disposed at suitable parts of the core to thereby further reduce the generation of the leakage flux field.

8. The flyback transformer according to claim 5 or 6, wherein said first and second secondary windings are electrically connected in series and are provided with a rectifier circuit.

9. A flyback transformer according to claim 8 wherein said rectifier circuit comprises two diodes respectively provided on opposite sides of said first secondary winding.

10. A flyback transformer according to claim 8 wherein said rectifier circuit comprises a voltage doubler rectifier circuit provided between said first and second secondary windings.

11. A flyback transformer according to claim 9, wherein said rectifier circuit comprises a voltage doubler circuit provided between said first and second secondary windings.

12. A flyback transformer according to claim 10, wherein said voltage doubler rectifier circuit comprises:

first, second and third diodes connected in series between said first and second secondary windings;

a first capacitor connected in parallel between the junction of the first and second diodes and the junction of the third diode and the second secondary winding; and a second capacitor connected in parallel between the junction of the second and third diodes and the output end of said second secondary windings.

13. A flyback transformer according to claim 12 wherein said first voltage doubler rectifier circuit comprises: a resistance and first and second diodes all connected in series between one output terminal and said first secondary winding; third and fourth diodes connected in series between said first and second secondary windings; a first capacitor connected in parallel between the junction of said first and second diodes and the junction of said first secondary winding and said third diode; and a second capacitor connected in parallel between the junction of said second diode and said first secondary winding and the junction of said third and fourth diodes; and said second voltage doubler rectifier circuit comprises: a fifth diode connected in series between said fourth diode and said second secondary winding; sixth and seventh diodes connected in series between said second secondary winding and the other output terminal; a third capacitor connected in parallel between the junction of said fourth and fifth diodes and the junction of said second secondary winding and said sixth diode; and a fourth capacitor connected in parallel between the junction Of said fifth diode and said second secondary winding and the junction of said sixth and seventh diodes.

* * * * *